(12) United States Patent
Brilmyer et al.

(10) Patent No.: US 11,557,815 B2
(45) Date of Patent: Jan. 17, 2023

(54) BATTERY SEPARATOR CONFIGURED FOR REDUCING ACID STRATIFICATION FOR ENHANCED FLOODED BATTERIES

(71) Applicant: MICROPOROUS, LLC, Piney Flats, TN (US)

(72) Inventors: George Brilmyer, Piney Flats, TN (US); David Mihara, Johnson City, TN (US)

(73) Assignee: MICROPOROUS, LLC, Piney Flats, TN (US)

( * ) Notice: Subject to any disclaimer, the term of this patent is extended or adjusted under 35 U.S.C. 154(b) by 70 days.

(21) Appl. No.: 17/136,325

(22) Filed: Dec. 29, 2020

(65) Prior Publication Data

US 2021/0203035 A1 Jul. 1, 2021

Related U.S. Application Data

(60) Provisional application No. 62/955,099, filed on Dec. 30, 2019.

(51) Int. Cl.

| | | |
|---|---|---|
| *H01M 50/44* | (2021.01) | |
| *H01M 10/06* | (2006.01) | |
| *H01M 50/463* | (2021.01) | |
| *H01M 50/449* | (2021.01) | |
| *H01M 50/437* | (2021.01) | |

(Continued)

(52) U.S. Cl.
CPC .......... *H01M 50/44* (2021.01); *H01M 10/06* (2013.01); *H01M 50/449* (2021.01); *H01M 50/463* (2021.01); *H01M 50/491* (2021.01); *H01M 50/437* (2021.01); *H01M 50/454* (2021.01);

(Continued)

(58) Field of Classification Search
CPC .. H01M 50/44; H01M 50/463; H01M 50/491; H01M 50/437; H01M 50/454; H01M 50/457; H01M 50/489; H01M 10/06; H01M 2220/20
See application file for complete search history.

(56) References Cited

U.S. PATENT DOCUMENTS 6,120,939 A † 9/2000 Whear
6,689,509 B2 2/2004 Zucker
(Continued)

FOREIGN PATENT DOCUMENTS

WO 2019173661 A1 9/2019

OTHER PUBLICATIONS

Ahlstrom-Munksjo, "FortiCell LAB Fact Sheet", Bertrand Rupin, France (1 page), Oct. 13, 2020.
(Continued)

*Primary Examiner* — Christopher P Domone
*Assistant Examiner* — Kimberly Wyluda
(74) *Attorney, Agent, or Firm* — Jeffrey C. Watson; Grell & Watson Patent Attorneys LLC

(57) ABSTRACT

A battery separator configured for reducing acid stratification for an enhanced flooded battery. The battery separator for the enhanced flooded battery is configured to minimize acid stratification. The battery separator is comprised of a microporous membrane and an absorptive mat. The absorptive mat includes a 3-hour wicking height greater than 15 cm. Wherein the absorptive mat of the battery separator is configured to minimize acid stratification of the enhanced flooded battery.

18 Claims, 13 Drawing Sheets

(51) Int. Cl.
   *H01M 50/454* (2021.01)
   *H01M 50/489* (2021.01)
   *H01M 50/491* (2021.01)
   H01M 50/457 (2021.01)

(52) U.S. Cl.
   CPC ........ *H01M 50/457* (2021.01); *H01M 50/489* (2021.01); *H01M 2220/20* (2013.01)

(56) References Cited

U.S. PATENT DOCUMENTS

| | | |
|---|---|---|
| 10,141,556 B2 | 11/2018 | Miller et al. |
| 2003/0054235 A1 | 3/2003 | Zucker |
| 2004/0048144 A1 | 3/2004 | Fitter et al. |
| 2014/0255752 A1 | 9/2014 | Miller et al. |
| 2015/0086838 A1 | 3/2015 | Guo et al. |
| 2017/0077479 A1† | 3/2017 | Miller |
| 2017/0133650 A1 | 5/2017 | Krishnamoorthy et al. |
| 2017/0133720 A1 | 5/2017 | Kim et al. |
| 2018/0159122 A1* | 6/2018 | Guo .................... H01M 50/414 |
| 2018/0366710 A1 | 12/2018 | Whear et al. |
| 2020/0035974 A1* | 1/2020 | Miller .................. H01M 50/411 |

OTHER PUBLICATIONS

International Search Report and Written Opinion dated Mar. 25, 2021 for corresponding International Application No. PCT/US2020/067263.
BCIS-03A-BCI Recommended Test Methods for VRLA-AGM Battery Separators, Rev. Dec. 2015.†

\* cited by examiner
† cited by third party

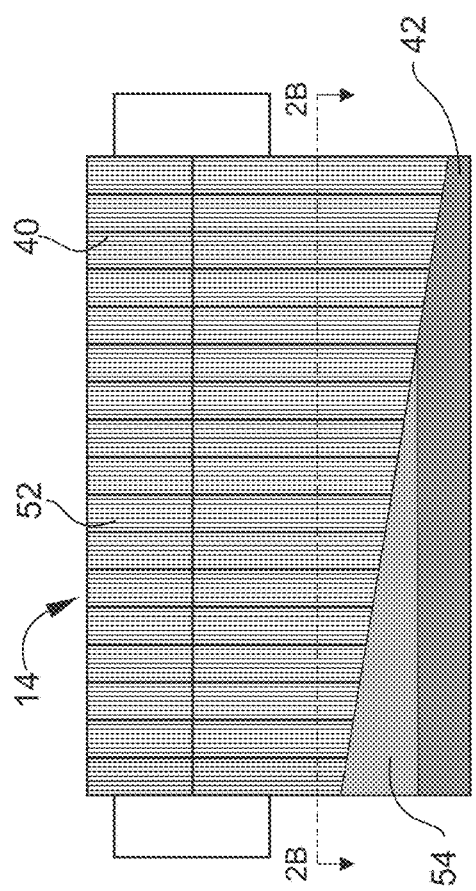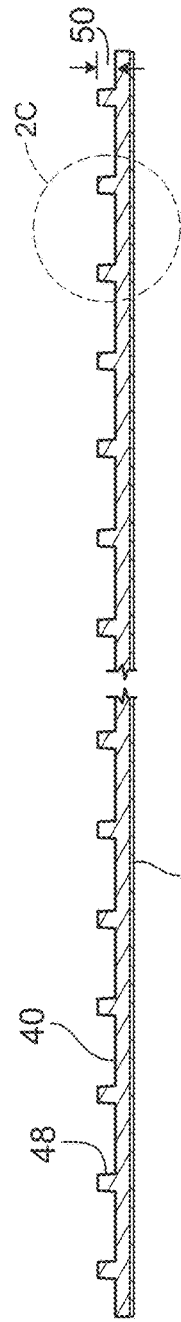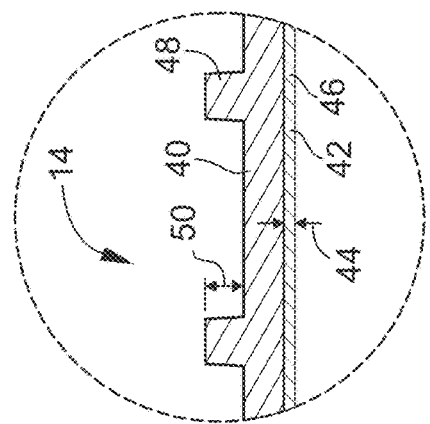
FIG. 2A
FIG. 2B
FIG. 2C

Acid Stratification Test

- 9 Plate Cells-hand burned - ~40Ah C/20
- EU 50342-9    17.05% Continuous Cycle Test

| Step | Time | Current | Percent |
|---|---|---|---|
| 1 - Rest | 30 min | 0A | |
| 2 - Discharge | 25 hours | 6A | -37.5% |
| 3 - Charge | 40 min | 105A (2.4vpc max) | +17.5% |
| 4 - Discharge | 30 min | 105A (1.0vpc min) | +13.5% |
| 5 - Repeat 3-4 | | | |
| 6 - Stop after 20 cycles | ~26 hours | | |

- General Result....
  20 Cycles produces "80-100 Points" of Acid Stratification

FIG. 6

Hand-Burned Cells
- 3 Cells per Case (covers removed)
- 2 Cases per Test

Acid Stratification Testing

Rocking Table +/- 13 degrees

Acid Stratification Test

- 9 Plate Cells-hand burned - ~40Ah C/20
- EU 50342-9   17.5% Continuous Cycle Test
- Testing done "Static" and "Rocking"

Example of test details>>>

| Test | Position | Sp. Gravity |
|---|---|---|
| FULL RECHARGE | Top | 1317 |
|  | Bottom | 1309 |
|  | *Stratification* | .002 |
| STATIC 20 CYCLES | Top | 1264 |
|  | Bottom | 1352 |
|  | *Stratification* | .087 |
| ROCKING 20 CYCLES | Top | 1278 |
|  | Bottom | 1334 |
|  | *Stratification* | .056 |

FIG. 9

BATTERY SEPARATOR CONFIGURED FOR REDUCING ACID STRATIFICATION FOR ENHANCED FLOODED BATTERIES

CROSS-REFERENCE TO RELATED APPLICATIONS

This application claims the priority benefit of U.S. Provisional Application No. 62/955,099, filed on Dec. 30, 2019, entitled "Battery Separator Configured for Reducing Acid Stratification for Enhanced Flooded Batteries", which is incorporated by reference herein in its entirety.

FIELD OF THE INVENTION

The present invention relates to a battery separator or separator system that will minimize or eliminate acid stratification in Enhanced Flooded Batteries.

BACKGROUND

Lead acid batteries have been popular, low cost rechargeable energy storage devices for more than a century. Despite low energy-to-volume ratio, a lead acid battery can provide high surge currents, which make it attractive for starter motors, automotive, forklifts, Uninterruptible Power Supply, etc. The two main types of lead acid batteries are flooded batteries ("not sealed") and valve regulated lead acid (VRLA) batteries ("sealed"). An "enhanced" flooded battery is an improved and more robust flooded lead acid battery, like for use in automobiles using "Idle-Start-Stop" technology. In this technology, the battery must provide power to maintain the car's electrical system when the alternator stops generating current. Other markets for this technology include automotive regenerative breaking and industrial opportunity charging (like Forklifts). Due to such demands, the technology needs a battery with fast charging and enhanced cycling capability. At present, "Start-Stop" vehicles use AGM (Absorbed Glass Mat) and EFB (Enhanced Flooded Battery), both supporting increased cycle life and fast charging capability.

The present disclosure may be designed to provide an added component to the existing enhanced flooded battery separator. The battery separator separates or divides the positive electrode from the negative electrode within a lead acid battery cell. The separator permits exchange of ions with least possible resistance, while preventing a short that will result from the positive and negative electrode touching each other. Flooded battery separators may be made from a porous matrix and may incorporate porous inorganic fillers such as Silica, Alumina, Zirconia, Mineral clays or others known to those skilled in the art. The flooded battery separator may also incorporate specific additives such as water loss mitigating substances, antioxidant substances and rubber latexes among other materials offering specifically desirable activity. The bulk of the separator may be comprised of crosslinked natural and/or synthetic rubber, organic polymers of varying molecular weight such as polyesters, polysulfones and polyolefins (typically of molecular weight between 300K and 12 MM). Other materials used to manufacture flooded battery separators include wet-laid and dry-laid nonwovens typically produced from polyester and/or glass fiber. In certain cases the nonwoven separator is coated with phenolic compounds to enhance oxidation resistance. Many such separators possess a laminate comprised of glass or polyester in the form of a scrim with an open pore structure attached to the side of the separator facing the positive plate. The laminate or scrim prevents the oxidation of the rubber or polymer from the oxidative potential of the positive electrode, thereby increasing the life of the separator.

Enhanced Flooded Batteries, also known as EFB batteries are an enhanced version of standard wet-flooded technology. These types of batteries should not be confused with standard flooded or AGM VRLA batteries. The primary benefits of EFB technology are improved charge acceptance and greater cyclic durability when operating in a reduced state of charge (typical of Stop Start applications). As an approximation, EFB batteries can provide up to 85,000 engine starts, compared to 30,000 starts from standard flooded product.

EFB batteries have been introduced as a lower tier option to AGM batteries in terms of performance, durability and cost. EFB technology relies on improvements to existing flooded technology through the addition of porous carbon additives in the plate manufacturing process. AGM batteries benefit from the inclusion of unique design features not found in wet-flooded batteries. These include glass mat separators, recombinant lid technology and higher pack pressures to facilitate improved cyclic lifespan. AGM batteries are better suited to meeting the demands of higher specification vehicles that include one or more of the following technologies: Start Stop, Regenerative Braking and Passive Boost.

Batteries that are used in a partial state of charge, such as Enhanced Flooded Batteries, that are used for Start/Stop applications, tend to have reduced lives because these batteries undergo acid stratification due to under-charging. As examples, and clearly not limited thereto, the disclosed issue of acid stratification may also be an issue for flooded deep cycle batteries and/or flooded deep cycle traction batteries. Flooded Deep Cycle batteries may be used in solar energy applications (these batteries rarely get enough overcharge to cause gassing, due to the undependability of the sun, and therefore tend to get stratified and have reduced life). Flooded Deep cycle traction batteries (i.e. for lift trucks) are typically subject to "opportunity charging". As such, these batteries also do not get enough charge at any one time, thus, minimal gassing and the acid becomes stratified.

In general, acid stratification-related failures occur when the electrolyte of a stratified battery having been concentrated at the bottom of the cell causes damage to both the positive and negative plates. The high concentration "heavy" acid concentration on the bottom of the cell increases positive grid corrosion and produces dense, inactive area of lead sulfate on the negative plate. In such a battery failure, the dense zone of heavily sulfated negative active material (NAM) at the bottom of the negative plate is separated from the healthy NAM near the top, by what the industry may refer to as a "tide-line". An unstratified cell has no visible tide-line. The unequal charge across the plates of a cell with severe acid stratification reduces CCA (cold cranking amps), and starting the engine is sluggish. Acid stratification typically occurs if the battery dwells at low charge (below 80 percent), never receives a full charge, and/or has shallow discharges. Driving a car for short distances with power-robbing accessories engaged contributes to acid stratification because the alternator cannot always apply a saturated charge. Large luxury cars are especially prone to acid stratification. Allowing the battery to rest for a few days or shaking the battery to create acid turbulence helps correct the problem. However, acid stratification cannot always be avoided.

However, with lead acid battery technology, and especially enhanced flooded lead acid battery technologies, there is always a need or desire for improvement. With growing energy demands of energy storage batteries and enhanced flooded batteries of start stop vehicles, there is a need for continued improvement of lead acid battery technology. The instant disclosure recognizes the need to provide lead acid batteries, and especially enhanced flooded lead acid batteries with reduced acid stratification issues.

The present disclosure may be designed to address at least certain aspects of the problems or needs discussed above by providing new and/or improved flooded battery separators and enhanced flooded batteries configured for reducing acid stratification.

SUMMARY

Accordingly, in one aspect, the present invention embraces a battery separator configured for reducing acid stratification in an enhanced flooded battery. The battery separator for the enhanced flooded battery is configured to minimize acid stratification. The battery separator may be comprised of a microporous membrane and an absorptive mat.

One feature of the disclosed battery separator may be that the absorptive mat may be configured to minimize acid stratification of the enhanced flooded battery.

Another feature of the disclosed battery separator may be that the absorptive mat includes a 3-hour wicking height greater than 15 cm. In select embodiments, the absorptive mat may include a 3-hour wicking height greater than 25 cm. In select possibly preferred embodiments, the absorptive mat may include a 3-hour wicking height greater than 35 cm. In select embodiments, the absorptive mat may have a wicking height of at least 50 mm in 2 minutes. In select embodiments of the disclosed battery separator, the material wicking height of the absorptive mat may be at least 50 mm in 1 minute. As an example, and clearly not limited thereto, when the absorptive mat of the disclosed battery separator may have a Brunauer-Emmett-Teller ("BET") of 0.9 m2/gram, the absorptive mat may have a material wicking height of: 64 mm at 1 minute, 89 mm at 2 minutes, 125 mm at 5 minutes, and 257 mm at 30 minutes. As another example, and clearly not limited thereto, when the absorptive mat of the disclosed battery separator may have a BET of 1.3 m2/gram, the absorptive mat may have a material wicking height of: 55 mm at 1 minute, 74 mm at 2 minutes, 112 mm at 5 minutes, and 236 mm at 30 minutes. As another example, and clearly not limited thereto, when the absorptive mat of the disclosed battery separator may have a BET of 0.9 m2/gram, the absorptive mat may have a material wicking height of: 10 cm in 7 minutes; 32 cm in 2 hours; and 39 cm in 3 hours. As another example, and clearly not limited thereto, when the absorptive mat of the disclosed battery separator may have a BET of 1.3 m2/gram, the absorptive mat may have a material wicking height of: 10 cm in 9 minutes; 30 cm in 2 hours; and 37 cm in 3 hours.

Another feature of the disclosed battery separator may be that the absorptive mat may have a thickness configured to swell when wetted. In select embodiments, the thickness of the absorptive mat may be less than 1.0 mm. In other select embodiments, the thickness of the absorptive mat may be less than 0.5 mm.

Another feature of the disclosed battery separator may be that the absorptive mat may be made from microfibers. The microfibers may be fibers having a diameter of less than 1 micrometer. In select embodiments, at least 10% of the absorptive mat may be microfibers having a diameter of less than 1 micrometer. In other select embodiments, the microfibers of the absorptive mat may include glass microfibers. In select embodiments of the absorptive mat, the microfibers of the absorptive mat consist only of glass microfibers. In other select embodiments, the microfibers of the absorptive mat may include polymeric microfibers. In select embodiments of the absorptive mat, the microfibers of the absorptive mat consist only of polymeric microfibers. In a possibly preferred embodiment, the microfibers of the absorptive mat may include a combination of glass microfibers and polymeric microfibers. In select possibly most preferred embodiments of the absorptive mat, the microfibers of the absorptive mat consist only of the combination of glass microfibers and polymeric microfibers.

Another feature of the disclosed battery separator may be that the microporous membrane can be primarily flat. The primarily flat microporous membrane may have no primary ribs. In select embodiments, the primarily flat microporous membrane may have mini-ribs. The mini-ribs of the primarily flat microporous membrane may have a height. In select embodiments, the height of the mini-ribs of the primarily flat microporous membrane may be 0.1 mm. In other select embodiments, the height of the mini-ribs of the primarily flat microporous membrane may be 0.3 mm. In other select embodiments, the height of the mini-ribs of the primarily flat microporous membrane may include a combination of 0.1 mm and 0.3 mm. In other select embodiments, the primarily flat microporous membrane may have an embossed texture. The embossed texture of the primarily flat microporous membrane may be on one side or both sides of the microporous membrane. In select embodiments, the embossed texture of the primarily flat microporous membrane may resemble a 100 grit sand-paper.

In select embodiments of the disclosed battery separator, the absorptive mat may be on both sides of the microporous membrane.

In other select embodiments of the disclosed battery separator, a non-absorptive glass mat may be included. The non-absorptive glass mat may be separated by and laminated to the non-absorptive glass mat (such as Johns Manville B-10).

In select embodiments of the disclosed battery separator, the flooded or EFB battery may be a flooded automotive lead-acid battery that has free acid that is prone to acid stratification under start-stop operation. The flooded automotive lead-acid battery is not sealed, where the flooded automotive lead-acid battery is configured to allow water to be added post-production.

One feature of the disclosed battery separator may be that the absorptive mat may have the ability to swell when wetted and thus increase its thickness.

In another aspect, the instant disclosure embraces a battery separator for an enhanced flooded battery in any of the various embodiments and/or combination of embodiments shown and/or described herein.

In another aspect, the instant disclosure embraces an enhanced flooded battery including the disclosed battery separator in any of the various embodiments and/or combination of embodiments shown and/or described herein. Accordingly, the enhanced flooded battery may include the disclosed battery separator configured for the enhanced flooded battery. The battery separator used in the disclosed enhanced flooded battery may be configured to minimize acid stratification. The battery separator used in the disclosed enhanced flooded battery may be comprised of a microporous membrane and an absorptive mat. The absorptive mat may have the ability to swell when wetted and thus increase its thickness. Wherein, the absorptive mat of the battery separator may be configured to minimize acid stratification of the disclosed enhanced flooded battery.

One feature of the disclosed enhanced flooded battery with the disclosed battery separator may be that the absorptive mat may have a thickness configured to swell when wetted. In select embodiments, the thickness of the absorptive mat may be less than 1.0 mm. In other select embodiments, the thickness of the absorptive mat may be less than 0.5 mm.

Another feature of the disclosed enhanced flooded battery with the disclosed battery separator may be that the absorptive mat may be made from microfibers. The microfibers may be fibers having a diameter of less than 1 micrometer. In select embodiments, at least 10% of the absorptive mat may be microfibers having a diameter of less than 1 micrometer. In other select embodiments, the microfibers of the absorptive mat may include glass microfibers. In select embodiments of the absorptive mat, the microfibers of the absorptive mat consist only of glass microfibers. In other select embodiments, the microfibers of the absorptive mat may include polymeric microfibers. In select embodiments of the absorptive mat, the microfibers of the absorptive mat consist only of polymeric microfibers. In a possibly preferred embodiment, the microfibers of the absorptive mat may include a combination of glass microfibers and polymeric microfibers. In select possibly most preferred embodiments of the absorptive mat, the microfibers of the absorptive mat consist only of the combination of glass microfibers and polymeric microfibers.

Another feature of the disclosed enhanced flooded battery with the disclosed battery separator may be that the microporous membrane can be primarily flat. The primarily flat microporous membrane may have no primary ribs. In select embodiments, the primarily flat microporous membrane may have mini-ribs. The mini-ribs of the primarily flat microporous membrane may have a height. In select embodiments, the height of the mini-ribs of the primarily flat microporous membrane may be 0.1 mm. In other select embodiments, the height of the mini-ribs of the primarily flat microporous membrane may be 0.3 mm. In other select embodiments, the height of the mini-ribs of the primarily flat microporous membrane may include a combination of 0.1 mm and 0.3 mm. In other select embodiments, the primarily flat microporous membrane may have an embossed texture. The embossed texture of the primarily flat microporous membrane may be on one side or both sides of the microporous membrane. In select embodiments, the embossed texture of the primarily flat microporous membrane may resemble a 100 grit sand-paper.

In select embodiments of the disclosed enhanced flooded battery with the disclosed battery separator, the absorptive mat may be on both sides of the microporous membrane.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 2A shows a layered roll of the battery separator for the enhanced flooded battery with mini-ribs or an embossed texture on the top (positive plate side of the separator), the absorptive mat, and a non-absorptive mat sandwiched therebetween, according to select embodiments of the instant disclosure, affixed to both sides of the battery separator;

FIG. 2B shows a cross-section of a battery separator according to select embodiments of the instant disclosure with mini-ribs;

FIG. 2C shows a zoomed-in detailed view of the cross-section of the battery separator from FIG. 2B;

FIG. 6 shows a table of an acid stratification test according to select embodiments of the instant disclosure;

FIG. 9 shows a table of an acid stratification test according to select embodiments of the instant disclosure;

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-13, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 1:
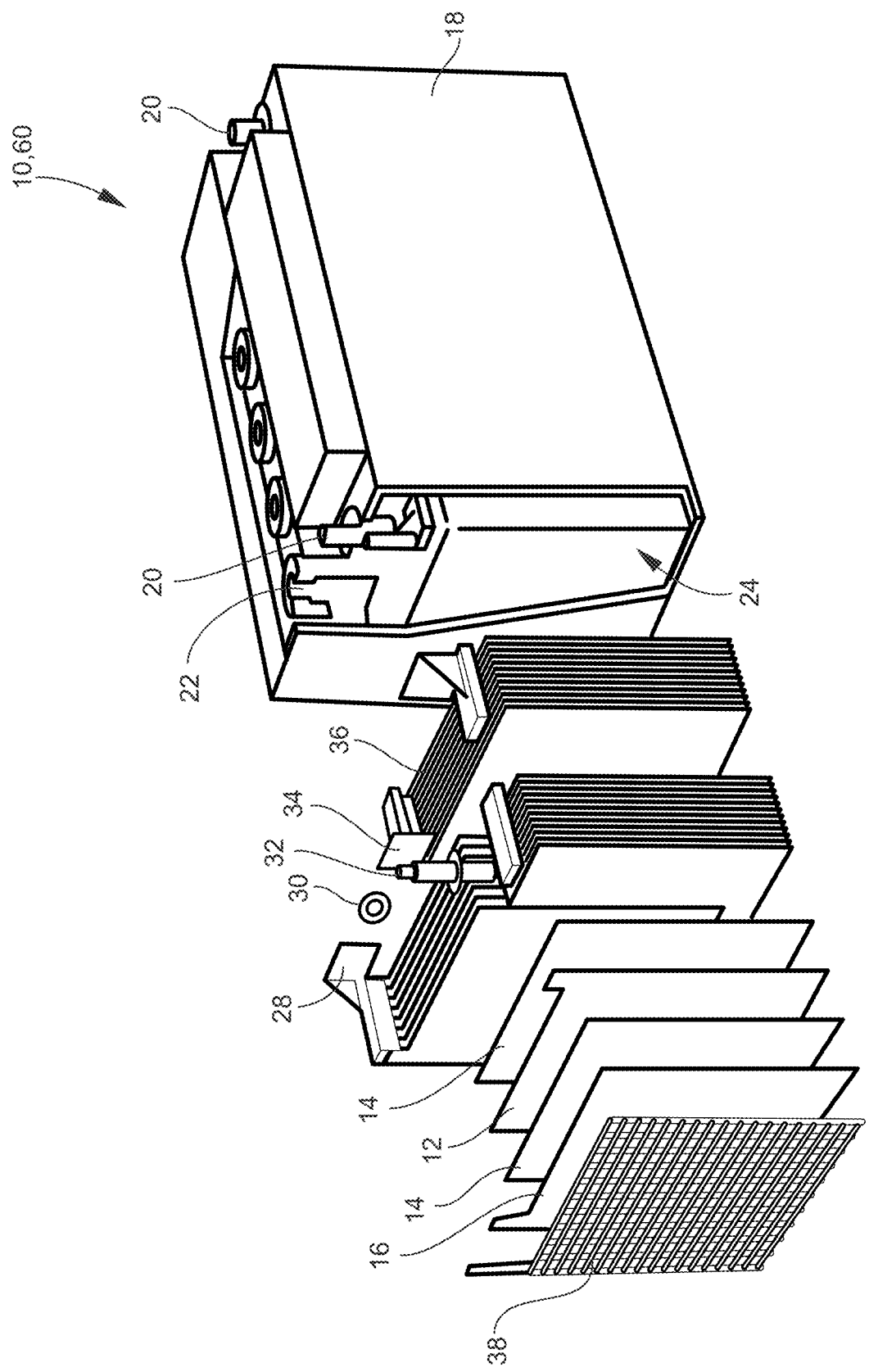
FIG. 1 illustrates an enhanced flooded battery with a cut away portion showing the internal components of the enhanced flooded battery for utilizing the disclosed battery separator configured for reducing acid stratification according to select embodiments of the instant disclosure.

Referring now to FIG. 1, in a possibly preferred embodiment, the present disclosure overcomes the above-mentioned disadvantages and meets the recognized need for such an apparatus or method by providing of lead-acid battery 10. Lead-acid battery 10 may be any size or type of lead-acid battery, including, but not limited to, a flooded or an enhanced flooded battery ("EFB") 60, as shown in FIG. 1. Flooded or EFB battery 60, as shown in FIG. 1, as commonly known and disclosed herein may be a flooded automotive lead-acid battery that has free acid that is prone to acid stratification under start-stop operation. The flooded automotive lead-acid battery is not sealed, or is a lead-acid battery that allows water to be added post-production (on the other hand, sealed batteries like valve regulated lead acid, "VRLA", are sealed and will not allow water to be added post-production). As shown, battery 10 includes negative plate (electrode) 12 and positive plate (electrode) 16 with separator 14 sandwiched therebetween. These components are housed within container, case or housing 18 that also includes terminal posts 20, valve adapter and valve 22, and electrolyte 24. A positive plate pack is shown with positive cell connection 28 and a negative pole 32. A negative plate pack 36 is shown with a negative cell connection 34. An electrolyte tight sealing ring 30 is shown for sealing electrolyte 24. Also shown is grid plate 38. Although a particular battery is shown, the inventive additive may be used in many different types of batteries or devices including for example, but not limited to, flooded deep cycle batteries, flooded deep cycle traction batteries AGM batteries, sealed lead-acid, flooded lead-acid, ISS lead-acid, combined battery and capacitor units, other battery types, capacitors, accumulators, and/or the like.

Figure 3:
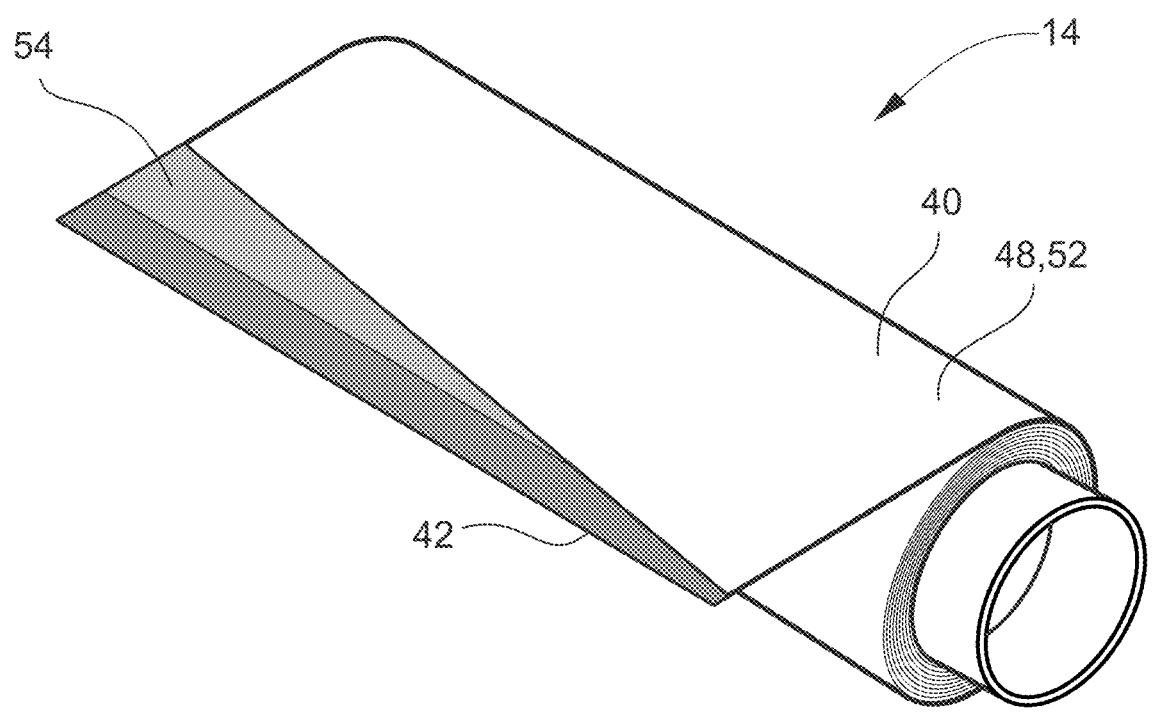
FIG. 3 shows a side view of the layered roll of the battery separator for the enhanced flooded battery of FIG. 2A.

Referring now to FIGS. 2-3, the present disclosure solves the aforementioned limitations of the currently available battery separator technologies by providing battery separator 14 for lead-acid battery 10, like enhanced flooded battery or EFB battery 60. The provided battery separator 14 may be configured for reducing or minimizing acid stratification of electrolyte 24 inside of battery 10, like EFB battery 60. Battery separator 14 may provide a lower cost option compared to 100% AGM batteries and their separators. In addition, battery separator 14 configured for reducing or minimizing acid stratification of electrolyte 24 inside of battery 10, like EFB battery 60 may be easier to assemble compared to AGM batteries and their separators.

In general, battery separator 14 may be comprised of microporous membrane 40 and absorptive mat 42. Absorptive mat 42 may have the ability to swell when wetted and thus increase its thickness 44. Wherein absorptive mat 42 of battery separator 14 may be configured to minimize acid stratification of enhanced flooded battery 60. Absorptive mat may have thickness 44 configured to swell when wetted. In select embodiments, thickness 44 of absorptive mat 42 may be less than 1.0 mm. In other select possibly preferred embodiments, thickness 44 of absorptive mat 42 may be less than 0.5 mm.

Absorptive mat 42, as defined herein, may be a mat or material configured for absorbing electrolyte 24 inside of battery 10. Absorptive mat 42 may be made from any materials of methods configured for absorbing electrolyte 24 inside of battery 10. One feature of battery separator 14 may be that absorptive mat 42 may have a 3-hour wicking height greater than 10 cm. In select embodiments, absorptive mat 42 may include a 3-hour wicking height greater than 15 cm. In select possibly preferred embodiments, absorptive mat 42 may include a 3-hour wicking height greater than 25 cm. Yet in select possibly most preferred embodiments, absorptive mat 42 may include a 3-hour wicking height greater than 35 cm. In select embodiments, absorptive mat 42 may have a wicking height of at least 50 mm in 2 minutes. In select possibly preferred embodiments of battery separator 14, the material wicking height of absorptive mat 42 may be at least 50 mm in 1 minute. As an example, and clearly not limited thereto, when absorptive mat 42 of battery separator 14 may have a Brunauer-Emmett-Teller ("BET") of 0.9 m2/gram, absorptive mat 42 may have a material wicking height of: 64 mm at 1 minute, 89 mm at 2 minutes, 125 mm at 5 minutes, and 257 mm at 30 minutes. As another example, and clearly not limited thereto, when absorptive mat 42 of battery separator 14 may have a BET of 1.3 m2/gram, absorptive mat 42 may have a material wicking height of: 55 mm at 1 minute, 74 mm at 2 minutes, 112 mm at 5 minutes, and 236 mm at 30 minutes. As another example, and clearly not limited thereto, when absorptive mat 14 of battery separator 14 may have a BET of 0.9 m2/gram, absorptive mat 42 may have a material wicking height of: 10 cm in 7 minutes; 32 cm in 2 hours; and 39 cm in 3 hours. As another example, and clearly not limited thereto, when absorptive mat 42 of battery separator 14 may have a BET of 1.3 m2/gram, absorptive mat 42 may have a material wicking height of: 10 cm in 9 minutes; 30 cm in 2 hours; and 37 cm in 3 hours. BET is an industry standard used by the Battery Council International ("BCI") and stands for the Brunauer-Emmett-Teller (BET) theory, which aims to explain the physical adsorption of gas molecules on a solid surface and serves as the basis for an important analysis technique for the measurement of the specific surface area of materials. The observations are very often referred to as physical adsorption or physisorption. The wicking heights of the materials for absorptive mat 42 were measured pursuant to Section 11 of the BCI Technical Manual (see BCIS-03A Rev. December 15), which provides for wetting and wicking to measure the degree of electrolyte 24 wicking within battery separator 14.

In select embodiments, absorptive mat 42 may be made from microfibers 46. Microfibers 46 may be fibers having a diameter of less than 1 micrometer. In select embodiments, at least 10% of absorptive mat 42 may be microfibers having a diameter of less than 1 micrometer. Microfibers 46 may be any microfibers configured inside of absorptive mat 42 for absorbing electrolyte 24. In select embodiments, microfibers 46 of absorptive mat 42 may include glass microfibers. In select embodiments of absorptive mat 42, microfibers 46 of absorptive mat 42 may consist only of glass microfibers. In other select embodiments, microfibers 46 of absorptive mat 42 may include polymeric microfibers. In select embodiments of absorptive mat 42, microfibers 46 of absorptive mat 42 may consist only of polymeric microfibers. In a possibly preferred embodiment, microfibers 46 of absorptive mat 42 may include a combination of glass microfibers and polymeric microfibers. In select possibly most preferred embodiments of the absorptive mat, microfibers 46 of absorptive mat 42 may consist only of the combination of glass microfibers and polymeric microfibers.

Battery separator 14 may be provided in many different sizes, shaped and/or configurations with the combination of microporous membrane 40 and absorptive mat 42, including, but not limited to, any size, shapes and/or configurations standard in the art for lead-acid batteries, including, but not limited to, any size, shapes and/or configurations standard for separators configured for enhanced flooded batteries. One feature of the disclosed battery separator 14 configured for reducing acid stratification in EFB battery 60 may be that microporous membrane 40 of battery separator 14 can be primarily flat. As disclosed herein, primarily flat may mean than microporous membrane may have no primary ribs. However, as shown in FIGS. 2B, and 2C, in select embodiments, the primarily flat microporous membrane 40 of battery separator 14 may have mini-ribs 48. Mini-ribs 48 of primarily flat microporous membrane may have height 50. In select embodiments, height 50 of mini-ribs 48 of the primarily flat microporous membrane 40 may be 0.1 mm. Applicant notes that FIGS. 2B and 2C are not drawn to scale. In possibly preferred embodiments, mini-ribs 48 may be much shorter than thickness 44 of absorptive mat 42. In addition, mini-ribs 48 may preferably be proportionately narrow and positioned close together to provide for a plethora of such mini-ribs 48 on primarily flat microporous membrane 40. Furthermore, in select embodiments, the back web of microporous membrane 40 may preferably be the same approximate thickness as absorptive mat 42. As examples, and clearly not limited thereto, in possibly preferred embodiments, absorptive mat 42 may have thickness 42 of less than 0.5 mm or between approximately 0.5 mm and 1.0 mm, microporous membrane 40 may have a thickness between approximately 0.2 mm to 0.25 mm, and mini-ribs 48 may have height 50 of between 0.1 mm and 0.3 mm tall with the same approximate width of between 0.1 mm and 0.3 mm wide. In other select embodiments, height 50 of mini-ribs 48 of the primarily flat microporous membrane 40 may be 0.3 mm. In other select embodiments, height 50 of mini-ribs 48 of primarily flat microporous membrane 40 may include a combination of 0.1 mm and 0.3 mm. In other select embodiments, as best shown in FIG. 2A, the primarily flat microporous membrane 40 may have embossed texture 52. Embossed texture 52 of the primarily flat microporous membrane 40 may be on one side or both sides of microporous membrane 40. In select embodiments, embossed texture 52 of the primarily flat microporous membrane 40 may resemble 100 grit sand-paper, or the like.

Absorptive mat 42 may be attached on either side of microporous membrane 40. In select embodiments, absorptive mat 42 may be on both sides of microporous membrane 40. However, this would be the most expensive option and least preferred. The ideal cost/benefit option is to place the absorptive mat 42 only on the positive plate side of polymeric separator 40.

Referring now specifically to FIGS. 2A and 3, in other select embodiments of absorptive mat 42 of battery separator 14, non-absorptive glass mat 54 may be included. Non-absorptive glass mat 54 may be separated by and laminated to absorptive mat 42. Non-absorptive glass mat 54 may be any non-absorptive glass mat, including, but not limited to, Johns Manville B-10 (provided by Johns Manville Corporation of Denver, Colo.), or the like. By definition, any porous nonwoven glass mat may be absorptive (non-adsorptive infers non-porous). The Johns Manville B-10 example is still absorptive, but has much lower wicking and much less acid stratification reduction vs. the disclosed preferred absorptive mat 42.

In another aspect, the instant disclosure embraces battery separator 14 for enhanced flooded battery 60 in any of the various embodiments and/or combination of embodiments shown and/or described herein.

In another aspect, the instant disclosure embraces enhanced flooded battery 60 including the disclosed battery separator 14 in any of the various embodiments and/or combination of embodiments shown and/or described herein. Accordingly, enhanced flooded battery 60 may include the disclosed battery separator 14 configured for reducing or minimizing acid stratification of enhanced flooded battery 60. Accordingly, battery separator 14 used in the disclosed enhanced flooded battery 60 may generally be comprised of microporous membrane 40 and absorptive mat 42. As discussed above, absorptive mat 42 may have the ability to swell when wetted and thus increase its thickness. Wherein, absorptive mat 42 of battery separator 14 used in EFB battery 60 may be configured to minimize acid stratification of such enhanced flooded battery 60.

In sum, battery separator 14 may be configured for reducing acid stratification for enhanced flooded battery 60. Battery separator 14 for enhanced flooded battery 60 may be configured to minimize acid stratification. Battery separator 14 may be comprised of microporous membrane 40 and absorptive mat 42. In select embodiments, absorptive mat 42 may be comprised of microfibers having at least 10% of the fibers having a diameter of less than 1 micrometer. In select embodiments, absorptive mat 42 may be less than 1.0 mm thick. In possibly preferred embodiments, absorptive mat 42 may be less than 0.5 mm thick. In select embodiments, absorptive mat 42 may be comprised of glass microfibers, polymeric microfibers, or a combination of glass and polymeric microfibers. In select embodiments, microporous membrane 40 may be flat (i.e., no primary ribs typical of a flooded battery separator). In select embodiments, the primarily flat microporous membrane 40 may have mini-ribs 48 with height 50 of 0.1 mm on one or both sides. In other select embodiments, the primarily flat microporous membrane 40 may have mini-ribs 48 with height 50 of 0.3 mm on one or both sides. In other select embodiments, the primarily flat microporous membrane 40 may have embossed texture 52 on one or both sides. As an example, and clearly not limited thereto, embossed texture 52 may resemble 100 grit sand-paper, or the like. In select embodiments, absorptive mat 42 may be on both sides of microporous membrane 40. In select embodiments, microporous membrane 40 and absorptive mat 42 may be separated by and laminated to non-absorptive glass mat 54 (such as Johns Manville B-10). In select embodiments, absorptive mat 42 may have the ability to swell when wetted and thus increase its thickness.

In another aspect, the instant disclosure may be directed toward a method of making battery separator 14 in any of the embodiments shown and/or described herein.

In another aspect, the instant disclosure may be directed toward enhanced flooded battery 60 including battery separator 14 in any of the embodiments shown and/or described herein.

In yet another aspect, the instant disclosure may be directed toward a method of making enhanced flooded battery 60 with battery separator 14 in any of the embodiments shown and/or described herein.

EXAMPLES

Referring now to FIGS. 4-13, examples of battery separator 14 configured for reducing or minimizing acid stratification in battery 10, like enhanced flooded battery 60 is shown including a method of testing the reduction or minimization of acid stratification in battery 10, like enhanced flooded battery 60, and the results thereof.

Figure 4:
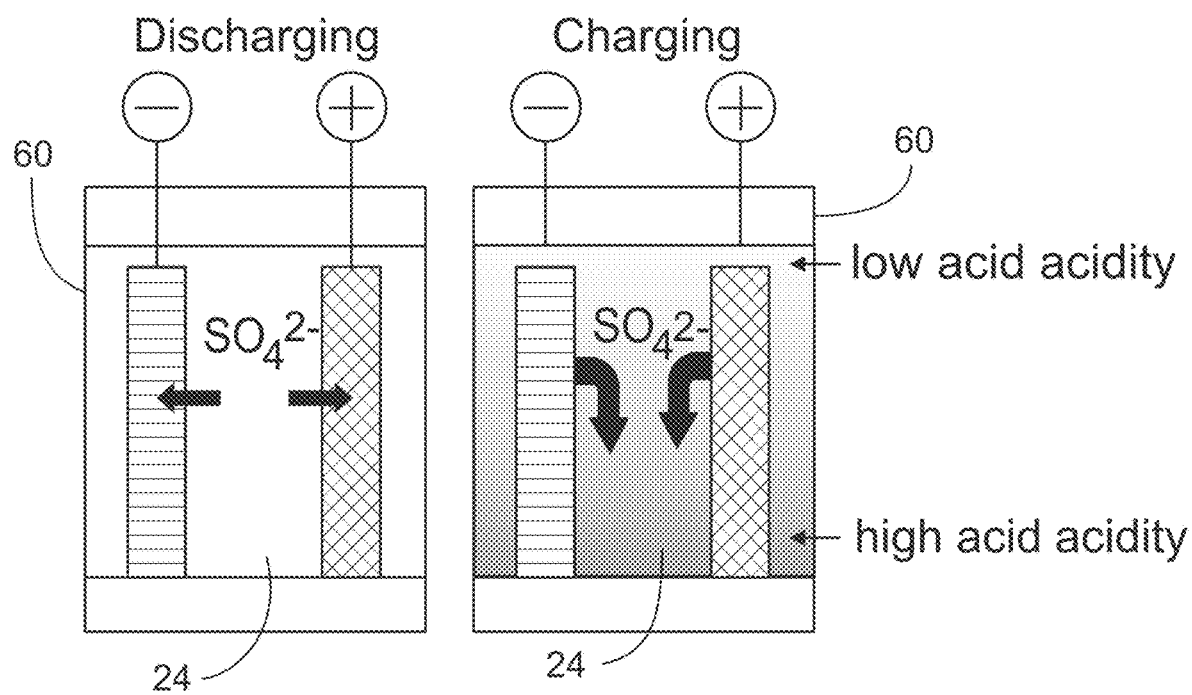
FIG. 4 shows a diagram cross-section of the enhanced flooded battery according to select embodiments of the instant disclosure showing acid stratification during cycling of the enhanced flooded battery.

As a visual example, carefully pouring a low gravity, low density beer (ex. American "light" beers) onto a higher gravity, higher density beer, (ex. Imperial stouts), provides a good visual example of acid stratification. Each beer has a different specific gravity so they stay in separate phases until forcibly mixed. Similar density differences are created in a lead battery during cycling. As best shown in FIG. 4, during recharge pure (1.800 SG) sulfuric acid comes out of the plates and it immediately falls to the bottom of the cell when it comes in contact with the lower SG acid in the cell. This creates acid stratification in the cell, as illustrated in FIG. 4.

Figure 5:
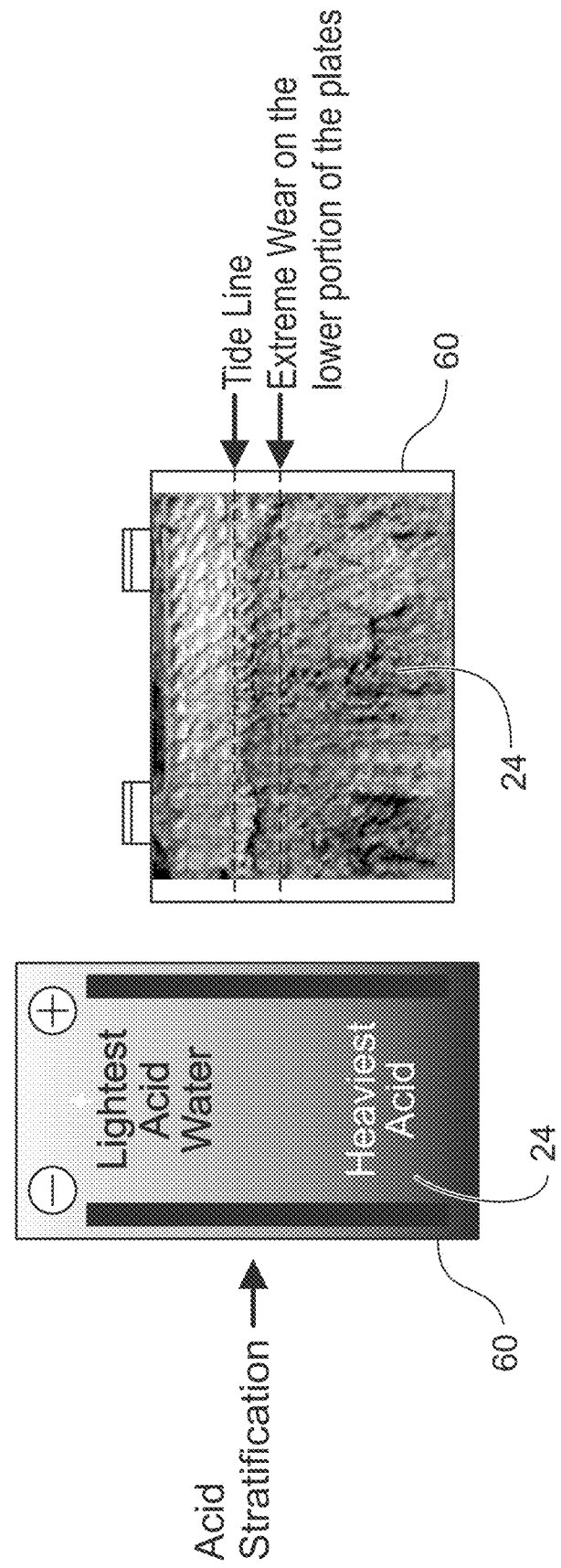
FIG. 5 shows another diagram of the enhanced flooded battery according to select embodiments of the instant disclosure showing acid stratification during cycling of the enhanced flooded battery and how it reduces battery life.

As shown in FIG. 5, if the cell is never fully recharged with vigorous gases, then the acid stays stratified and will eventually ruin the plates and shorten battery life. This is one of the failure modes in start-stop applications because the battery is operated in a partial state of charge.

The instant disclosure thus contemplated whether or not a separator of an enhanced flooded battery be used to reduce acid stratification.

A test was adopted that will produce acid stratification. In this test, 9 plate cells were hand burned at approximately 40 Ah C/20. Pursuant to EU 50342-6, these cells were then tested using the 17.5% CCT (continuous cycle test) and this generally produced 80-100 SG points of stratification. See the table shown in FIG. 6.

Figure 7:
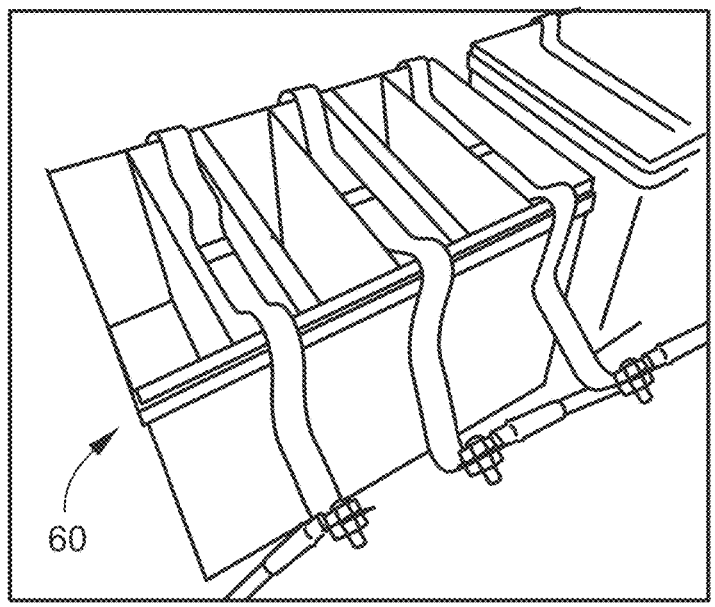
FIG. 7 shows a diagram of the hand-burned cells of the acid stratification test described in FIG. 6.

Referring to FIG. 7, each hand-burned cell had 3 cells per case with the covers removed and 2 cases per test.

Figure 8:
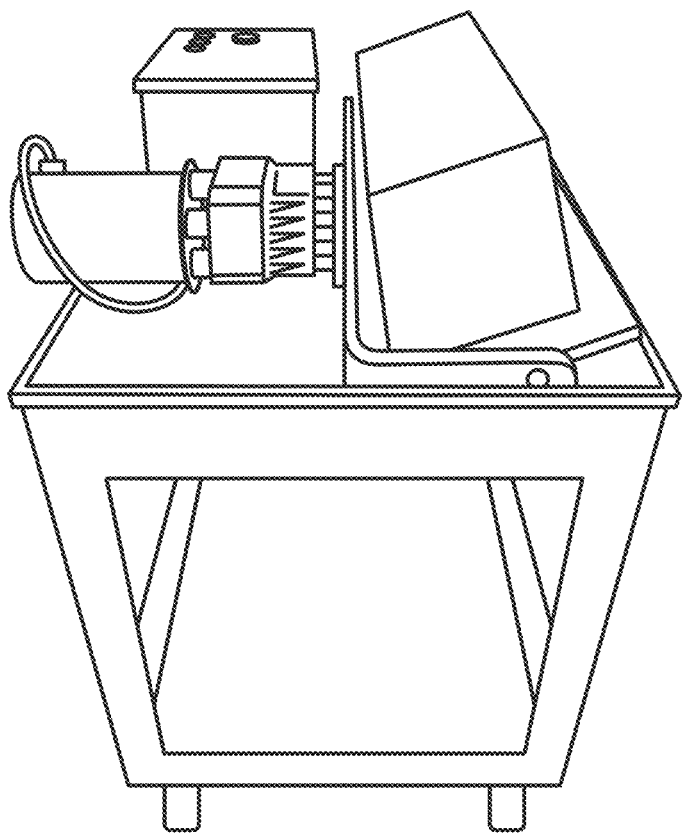
FIG. 8 shows a diagram of the rocking tables of the acid stratification test described in FIG. 6.

Referring now to FIG. 8, the cells were tested on a "rocking table" in two modes: static and rocking. The rocking provided plus and minus 13 degrees.

As shown in FIG. 9, typical results of these tests are shown. Static mode yields 0.087 SG of acid stratification. Note the SG's measured at the top and bottom of the cell. Rocking in this test reduced the stratification to 0.056 SG.

Figure 10:
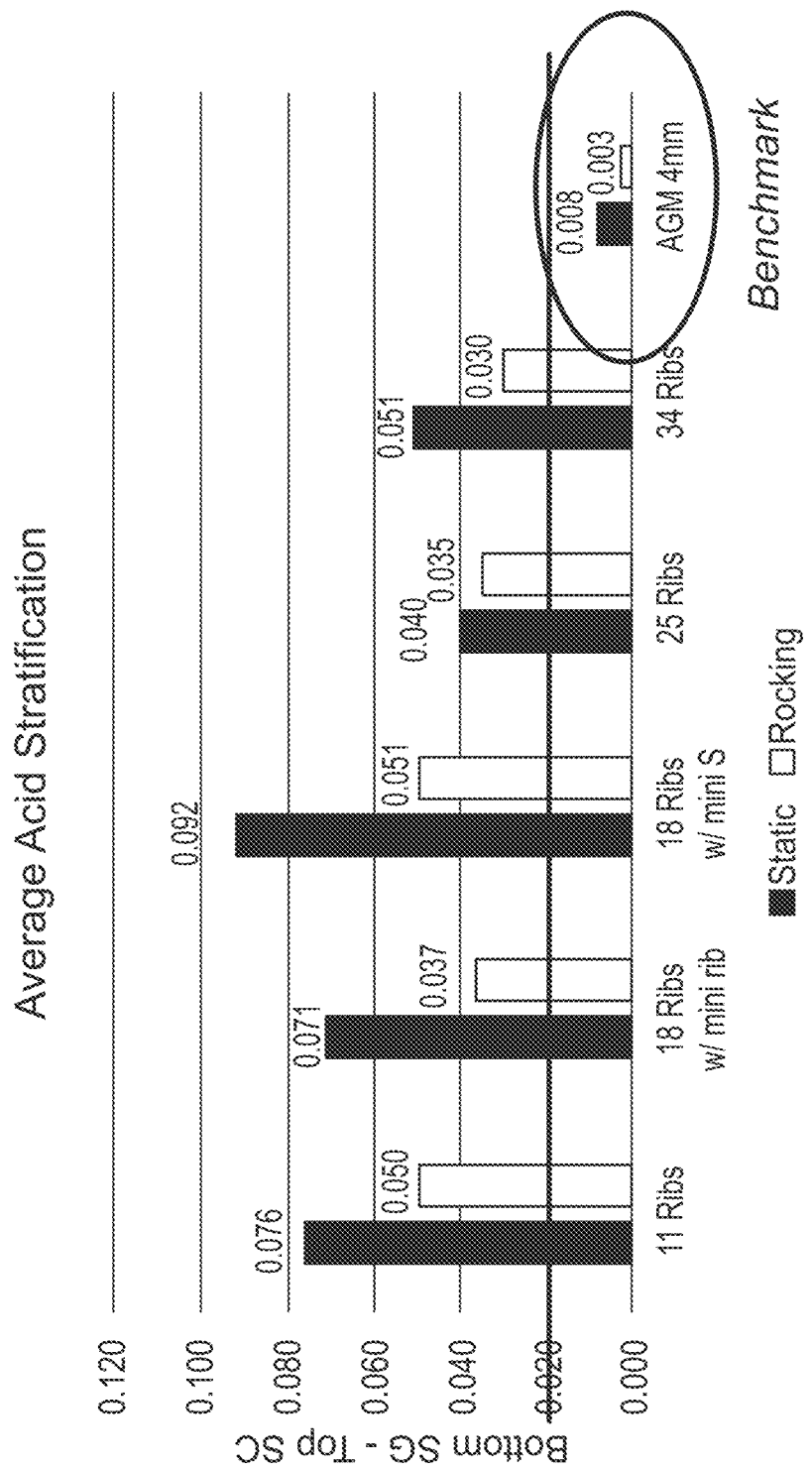
FIG. 10 shows a table of data from an acid stratification test according to select embodiments of the instant disclosure where the separator includes conventional vertical ribs.

Referring now to FIG. 10, data is shown for a series of conventional vertical rib separators. We can see that rocking always reduces the degree of stratification but in no instance does it approximate the AGM benchmark. Note for comparison purposes, all cells are flooded, including the cell with the AGM.

Figure 11:
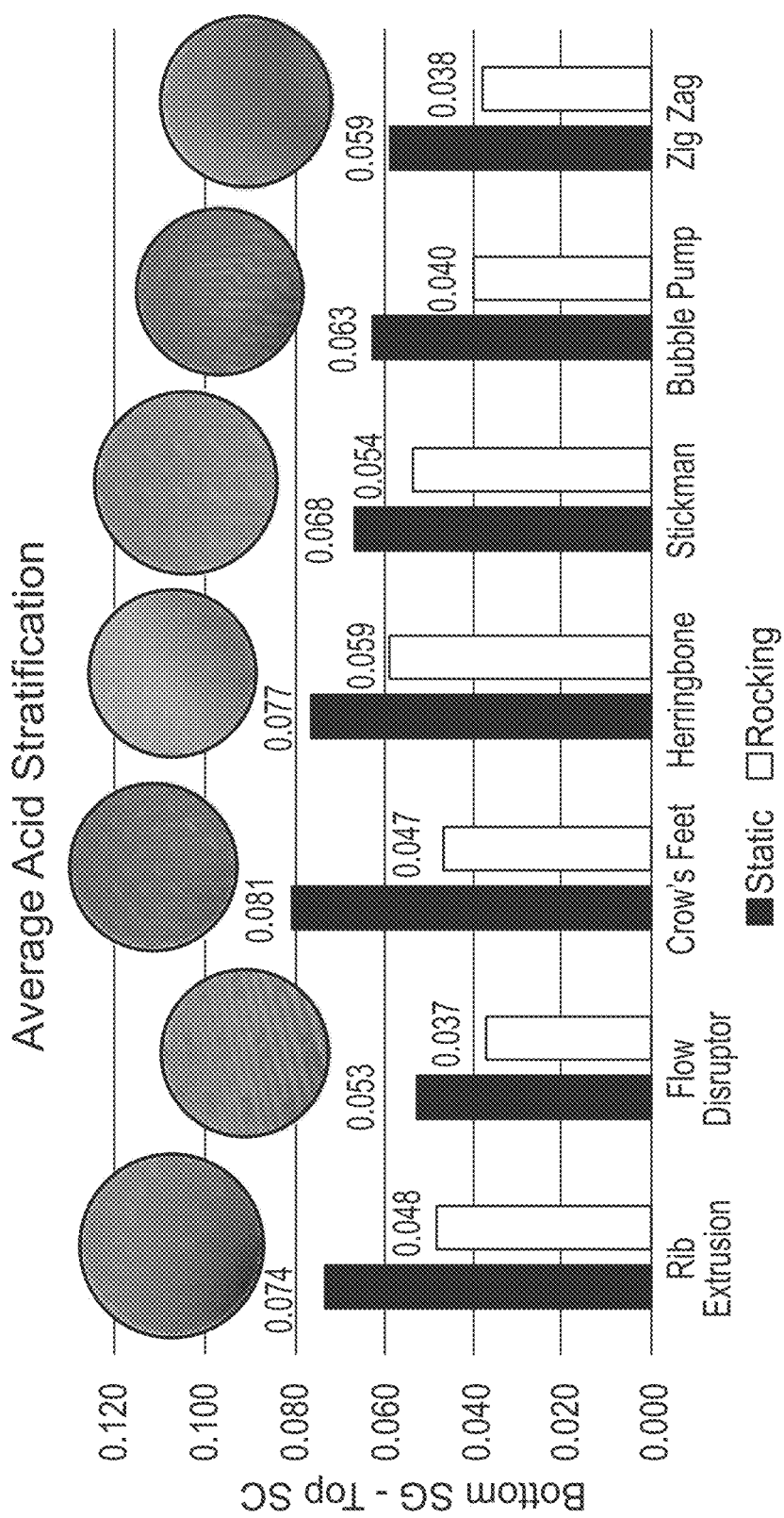
FIG. 11 shows a table of data from an acid stratification test according to select embodiments of the instant disclosure where the separator includes non-conventional vertical ribs.

Referring now to FIG. 11, shown is the results of 7 very non-conventional rib designs that were produced using a 3D printer. Notice that despite the unique rib patterns, the net result was not significant.

Figure 12:
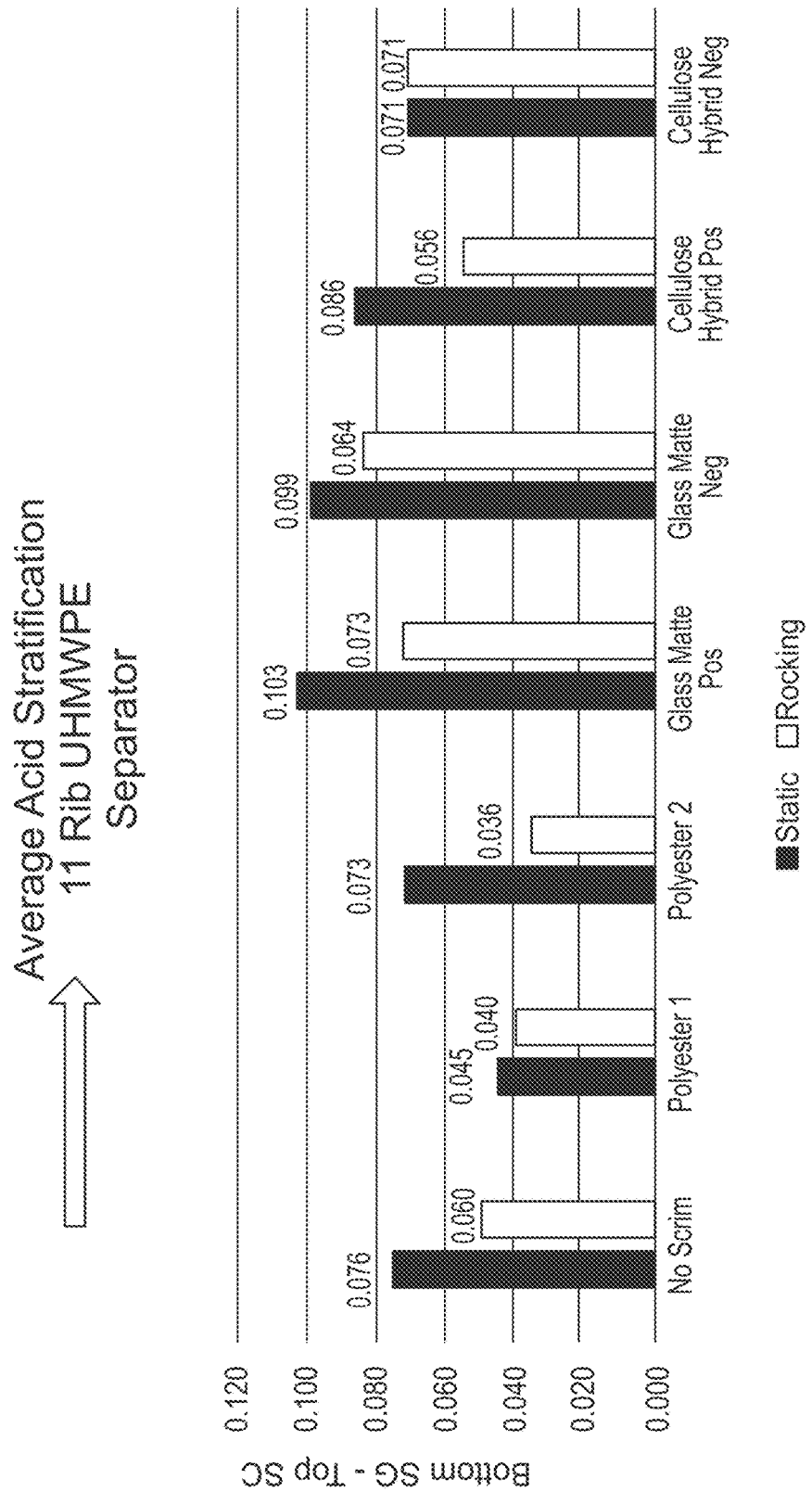
FIG. 12 shows a table of data from an acid stratification test according to select embodiments of the instant disclosure where the separator includes glass mattes and scrims.

Referring now to FIG. 12, shown is another test series where various glass mats and scrims were elevated on an 11 rib separator. Again, only slight variations and nothing that approximates the benchmark.

Figure 13:
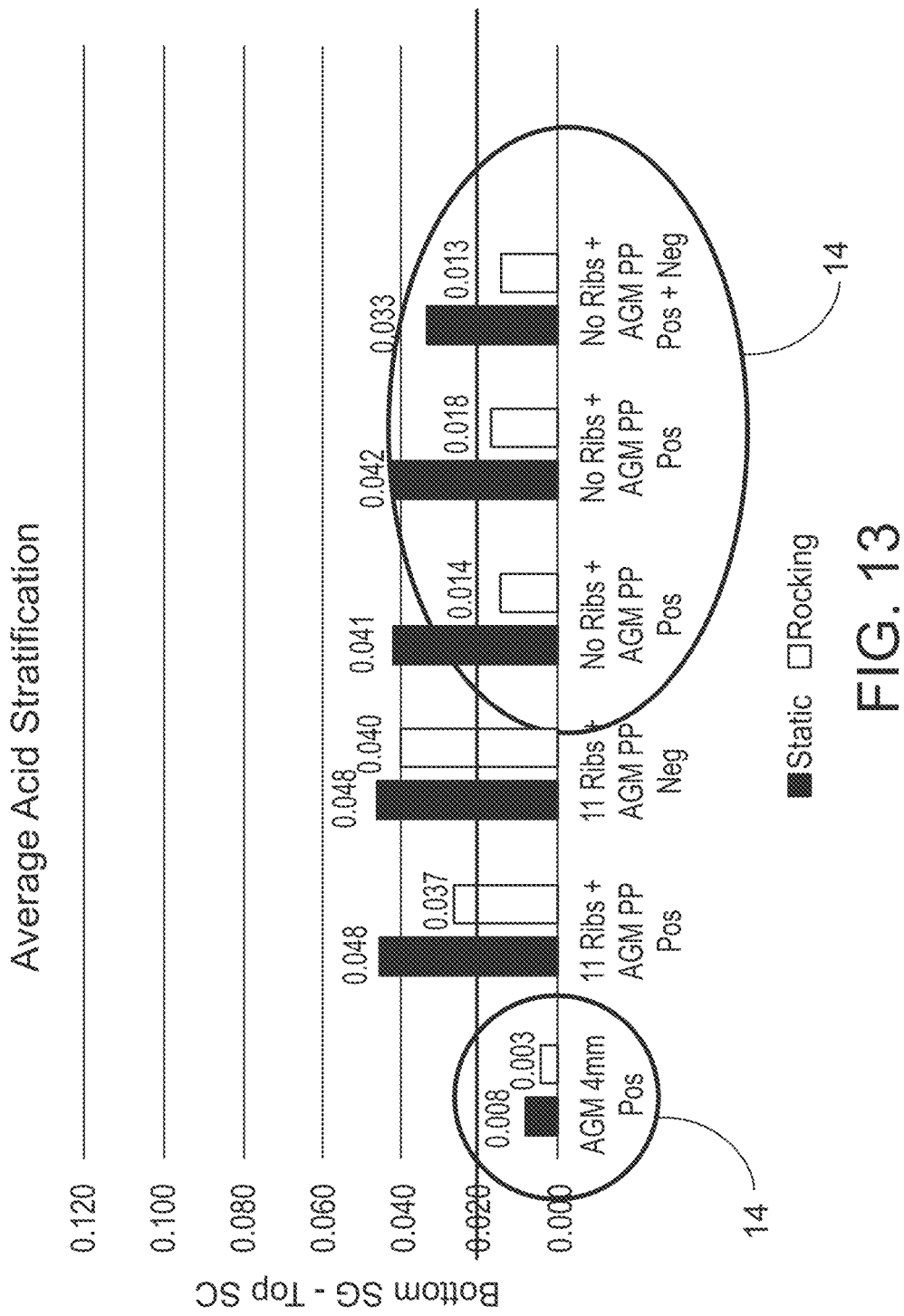
FIG. 13 shows a table of data from an acid stratification test according to select embodiments of the instant disclosure where the separator includes an AGM scrim or pasting paper.

Referring now to FIG. 13, the shown series of tests display some of the more impressive results obtained using an AGM pasting paper. Note that the AGM shows the best response when used in conjunction with a non-ribbed sheet of PE separator material. Also notice that applying the SGM to both the positive and negative is not significantly better than on the positive plate only.

In conclusion, the rocking was effective at lowering the degree of acid stratification. However, the rib pitch or spacing, and/or the rib patterns/design were not effective. Glass mats and scrims were slightly effective on ribbed separators. But the best results came from the use of glass mats and scrims which were very effective on un-ribbed separators (primarily flat).

The terminology used herein is for the purpose of describing particular embodiments only and is not intended to limiting of the invention. As used herein, the term "and/or" includes any and all combinations of one or more of the associated listed items. As used herein, the singular forms "a", "an" and "the" are intended to include the plural forms as well as the singular forms, unless the contest clearly indicates otherwise. It will be further understood that the terms "compromises" and/or "comprising" when used in this specification, specify the presence of stated features, steps, operations, elements and/or components, but do not preclude the presence of addition of one or more other features, steps, operations, elements, components and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of thermal enhancements are disclosed. Each of these has individual benefit, and each can also be used in conjunction with one or more, or in some cases all, of the other disclosed techniques. Accordingly, for the sake of clarity, the description will refrain from repeating every possible combination of the individual steps in an unnecessary fashion. Nevertheless, the specification and claims should be read with the understanding that such combinations are entirely within the scope of the intervention and the claims.

It will be evident, however, to one skilled in the art that the present invention may be practiced without specific details.

The present disclosure is to be considered as an exemplification of the invention, and is not intended to limit the invention to the specific embodiments illustrated by the figures or description below.

The present invention will not be described by referencing the appended figures representing preferred embodiments.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are with the spirit and scope of the present invention, are contemplated thereby, and are intended to be covered by the following general description.

The foregoing description comprises illustrative embodiments. Having thus described example embodiments, it should be noted by those skilled in the art that the within disclosures are example only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. A battery separator for an enhanced flooded battery comprising:
a microporous membrane; and
an absorptive mat configured with an ability to swell when wetted and thus increase a thickness, whereby, the absorptive mat includes a 3-hour wicking height greater than 15 cm, wherein, the absorptive mat is configured to minimize acid stratification of the enhanced flooded battery.

2. The battery separator of claim 1, wherein the absorptive mat including:
the 3-hour wicking height of the absorptive mat is greater than 25 cm; or
the 3-hour wicking height of the absorptive mat is greater than 35 cm;
wherein, a material wicking height of the absorptive mat is at least 50 mm in 2 minutes.

3. The battery separator of claim 2, wherein the wicking height of the absorptive mat is at least 50 mm in 1 minute, wherein:
when the absorptive mat has a Brunauer-Emmett-Teller ("BET") of 0.9 m2/gram, the material wicking height of the absorptive mat is:
64 mm at 1 minute;
89 mm at 2 minutes;
125 mm at 5 minutes; and
257 mm at 30 minutes;
when the absorptive mat has a BET of 1.3 m2/gram, the material wicking height of the absorptive mat is:
55 mm at 1 minute;
74 mm at 2 minutes;
112 mm at 5 minutes; and
236 mm at 30 minutes;
when the absorptive mat has a Brunauer-Emmett-Teller ("BET") of 0.9 m2/gram, the material wicking height of the absorptive mat is:
10 cm at 7 minutes;
32 cm in 2 hours; and
39 cm in 3 hours;
or
when the absorptive mat has a BET of 1.3 m2/gram, the material wicking height of the absorptive mat is:
10 cm at 9 minutes;
30 cm in 2 hours; and
37 cm in 3 hours.

4. The battery separator of claim 1, wherein the thickness of the absorptive mat is less than 1.0 mm.

5. The battery separator of claim 4, wherein the thickness of the absorptive mat is less than 0.5 mm.

6. The battery separator of claim 1, wherein the absorptive mat including microfibers, where at least 10% of the absorptive mat are fibers having a diameter of less than 1 micrometer, the microfibers of the absorptive mat include glass microfibers, polymeric microfibers, or a combination thereof.

7. The battery separator of claim 6, wherein the microfibers of the absorptive mat consist of the glass microfibers, the polymeric microfibers, or the combination thereof.

8. The battery separator of claim 1, where the microporous membrane is primarily flat, wherein the microporous membrane has no primary ribs.

9. The battery separator of claim 8 wherein the primarily flat microporous membrane including:
mini-ribs, where the mini-ribs are on one side or both sides of the microporous membrane, wherein the mini-ribs have a height of 0.1 mm, 0.3 mm, or a combination thereof;
an embossed texture on one side or both sides of the microporous membrane, where the embossed texture resembles 100 grit sand-paper; or
a combination thereof.

10. The battery separator of claim 1, wherein the absorptive mat is on both sides of the microporous membrane.

11. The battery separator of claim 1 further comprising a non-absorptive glass mat, wherein the microporous membrane and the absorptive mat are separated by and laminated to the non-absorptive glass mat.

12. The battery separator of claim 1, wherein the enhanced flooded battery is a flooded automotive lead-acid battery that has free acid that is prone to acid stratification under start-stop operation, where the flooded automotive lead-acid battery is not sealed, wherein the flooded automotive lead-acid battery is configured to allow water to be added post-production.

13. A battery separator for an enhanced flooded battery comprising:
a primarily flat microporous membrane including no primary ribs, the primarily flat microporous membrane includes:
mini-ribs on one or both sides of the primarily flat microporous membrane, the mini-ribs have a height of 0.1 mm, 0.3 mm, or a combination thereof; and
an absorptive mat configured with an ability to swell when wetted and thus increase a thickness, whereby, the absorptive mat includes a 3-hour wicking height greater than 15 cm, the absorptive mat includes at least 10% of microfibers having a diameter of less than 1 micrometer, wherein the microfibers of the absorptive mat include a combination of glass microfibers and polymeric microfibers, the absorptive mat has a thickness of less than 1.0 mm;
wherein the absorptive mat is configured to minimize acid stratification of the enhanced flooded battery.

14. The battery separator of claim 13 further comprising:
a non-absorptive glass mat, wherein the microporous membrane and the absorptive mat are separated by and laminated to the non-absorptive glass mat; and
the absorptive mat is on both sides of the microporous membrane.

15. Battery separator of claim 13, wherein:
the enhanced flooded battery is a flooded automotive lead-acid battery that has free acid that is prone to acid stratification under start-stop operation, where the flooded automotive lead-acid battery is not sealed, wherein the flooded automotive lead-acid battery is configured to allow water to be added post-production; and
wherein a material-wicking height of the absorptive mat is at least 50 mm in 2 minutes.

16. The battery separator of claim 13, wherein:
the 3-hour wicking height of the absorptive mat is greater than 25 cm; or
the 3-hour wicking height of the absorptive mat is greater than 35 cm;
wherein, a material wicking height of the absorptive mat is at least 50 mm in 2 minutes.

17. An enhanced flooded battery comprising:
a battery separator configured for the enhanced flooded battery, the battery separator comprising:
a microporous membrane; and
an absorptive mat, the absorptive mat includes a 3-hour wicking height greater than 15 cm;
wherein the absorptive mat of the battery separator is configured to minimize acid stratification of the enhanced flooded battery.

18. The enhanced flooded battery of claim 17, wherein:
the microporous membrane is primarily flat including no primary ribs, the primarily flat microporous membrane includes:

mini-ribs on one or both sides of the primarily flat microporous membrane, the mini-ribs have a height of 0.1 mm, 0.3 mm, or a combination thereof; and the absorptive mat including microfibers having a diameter of less than 1 micrometer, the absorptive mat including at least 10% of said microfibers, the microfibers of the absorptive mat include glass microfibers, polymeric microfibers, or a combination thereof;

the absorptive mate has a thickness of less than 1.0 mm;

wherein the material wicking height of the absorptive mat is at least 50 mm in 2 minutes;

wherein the absorptive mat is configured to minimize acid stratification of the enhanced flooded battery;

wherein the battery separator further comprising:
- a non-absorptive glass mat, wherein the microporous membrane and the absorptive mat are separated by and laminated to the non-absorptive glass mat; and
- the absorptive mat is on both sides of the microporous membrane;

the enhanced flooded battery is a flooded automotive lead-acid battery that has free acid that is prone to acid stratification under start-stop operation, where the flooded automotive lead-acid battery is not sealed, wherein the flooded automotive lead-acid battery is configured to allow water to be added post-production.

* * * * *